(12) United States Patent
Reiter et al.

(10) Patent No.: US 7,047,949 B2
(45) Date of Patent: May 23, 2006

(54) VENTING DEVICE

(75) Inventors: Frank Reiter, Haan (DE); Oliver Schönert, Dortmund (DE)

(73) Assignee: Siemens AG, Munich (DE)

( * ) Notice: Subject to any disclaimer, the term of this patent is extended or adjusted under 35 U.S.C. 154(b) by 115 days.

(21) Appl. No.: 10/877,294

(22) Filed: Jun. 24, 2004

(65) Prior Publication Data

US 2005/0016601 A1 Jan. 27, 2005

(30) Foreign Application Priority Data

Jun. 27, 2003 (DE) .......................... 103 29 121

(51) Int. Cl.
*F02M 33/02* (2006.01)
*F16K 24/02* (2006.01)

(52) U.S. Cl. .................. 123/516; 137/587; 137/579; 137/202

(58) Field of Classification Search ........... 123/516, 123/202, 587, 565.17, 577, 579
See application file for complete search history.

(56) References Cited

U.S. PATENT DOCUMENTS 3,643,690 A * 2/1972 Sarai ..................... 137/587
3,749,124 A * 7/1973 Andres ................... 137/587
3,913,599 A * 10/1975 McCugh .................. 137/1
4,700,734 A * 10/1987 McCauley ............... 137/236.1
4,799,509 A * 1/1989 Wawra et al. ............. 137/587
4,958,655 A * 9/1990 Danek .................... 137/80
6,089,249 A * 7/2000 Thibaut et al. ............ 137/202
6,302,137 B1 * 10/2001 Devall .................... 137/202
6,499,500 B1 * 12/2002 Rosseel ................. 137/15.17
6,591,857 B1 * 7/2003 Engle et al. .............. 137/202
6,779,544 B1 * 8/2004 Devall .................... 137/202
6,807,978 B1 * 10/2004 Burke et al. ............. 137/202
2005/0039728 A1 * 2/2005 Krogull et al. ............ 123/516

FOREIGN PATENT DOCUMENTS

| DE | 91 11 920.0 | 1/1991 |
| DE | 199 25 728 A1 | 12/2000 |
| WO | WO 01/21991 A1 | 3/2001 |
| WO | WO 02/26514 A2 | 4/2002 |

* cited by examiner

*Primary Examiner*—Thomas Moulis
(74) *Attorney, Agent, or Firm*—Richard A. Speer; Mayer, Brown, Rowe & Maw LLP

(57) ABSTRACT

In a venting device for a fuel tank (1), a venting line (5) has a movable section (6) and a spring element (14). The free end of the venting line (5) is prestressed against an upper wall of the fuel tank (1). This ensures that a valve (7) which is arranged at the free end of the venting line (5) is always arranged in the vicinity of the upper wall of the fuel tank (1).

12 Claims, 2 Drawing Sheets

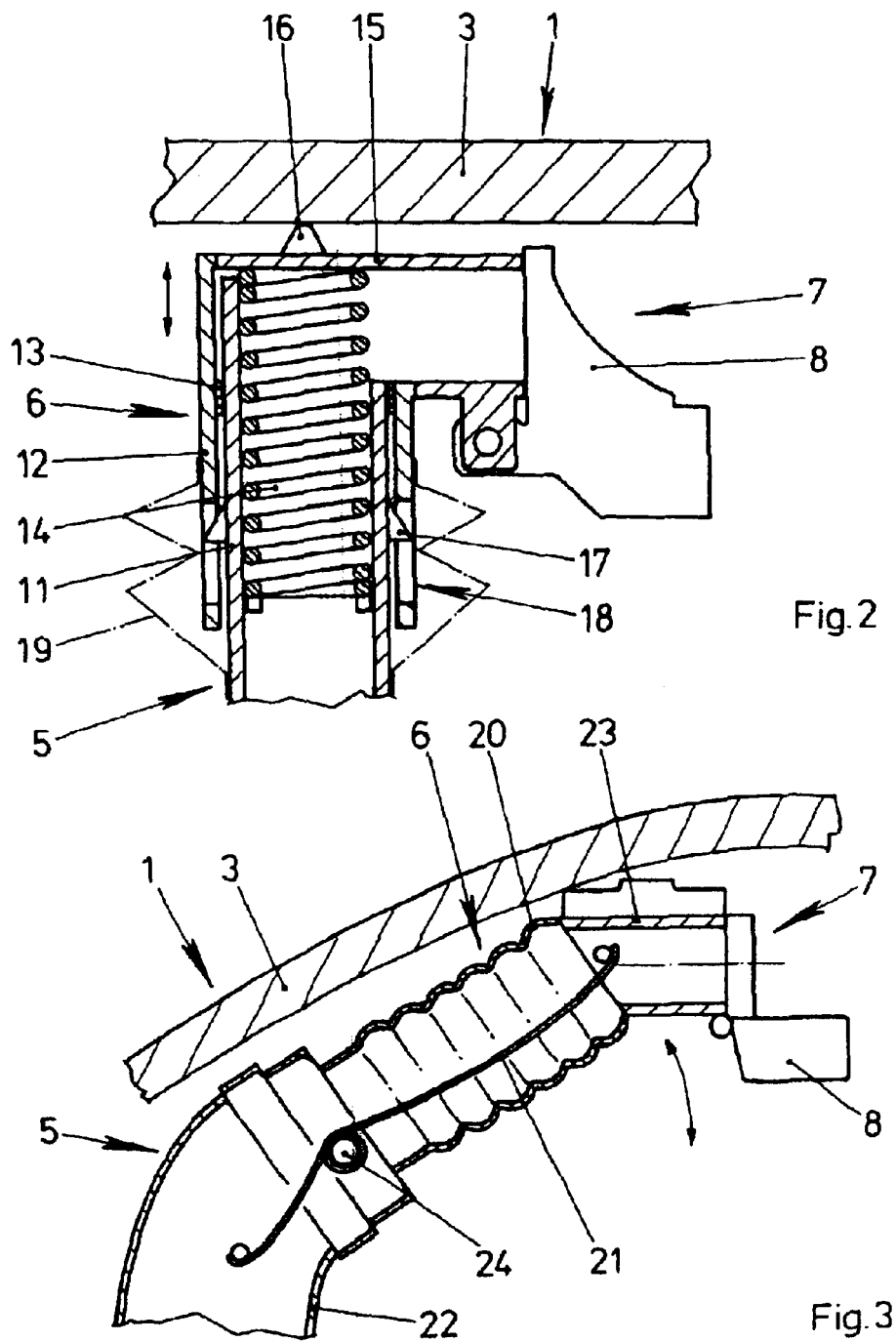

VENTING DEVICE

BACKGROUND OF THE INVENTION

The invention relates to a venting device for a fuel tank having a venting line which is arranged in the fuel tank and is guided as far as the upper wall.

Venting devices of this type are frequently used in modern fuel tanks and are known from practice. The venting line is frequently connected to a bubble tank of the venting device. In particular in the case of fuel tanks manufactured from shell parts, the bubble tank is generally fitted together with other components on the lower of the shell parts. The shell parts of the fuel tank are then connected to one another.

The venting line here requires a safety distance from the upper wall, so that the shell parts of the fuel tank can be reliably connected to one another. The safety distance has to compensate for the tolerances which arise through the manufacturing of the venting device and of the shell parts and the installation of the venting line. In addition, the wall of the fuel tank, after the tank is filled with fuel, may swell or sag, which causes the distance between the venting line and the upper wall of the fuel tank likewise to fluctuate. However, too great a distance of the venting line from the upper wall of the fuel tank results in it not being possible for the fuel tank to be vented when full.

The invention is based on the problem of developing a venting device of the type mentioned at the beginning in such a manner that the fuel tank is reliably vented even if there are large tolerances.

BRIEF DESCRIPTION OF THE INVENTION

This problem is solved according to the invention by the venting line having a movable section and by the free end of the venting line being held in its position by the upper wall of the fuel tank.

This design enables the venting device according to the invention to be fitted together with the venting line on one of the shell parts. When the second shell part is mounted upon it, the free end of the venting line is moved into a position in which the connection of the shell parts is not obstructed. The venting device according to the invention can thereby be higher than the fuel tank. A safety distance between the venting line and the upper wall of the fuel tank is therefore not required. The venting line is therefore arranged in the upper region of the fuel tank even if the venting line and the fuel tank have tolerances. This enables even a fuel tank which is filled with fuel to be reliably vented.

The venting device according to the invention can similarly be used in single-part fuel tanks.

The movable section could be plastically deformable, for example. Similarly, the free end of the venting device could be fastened, for example, to the upper wall of the fuel tank. However, this requires a high outlay on installation. According to one advantageous development of the invention, however, the free end of the venting line rests reliably on the upper wall, even if the bottom of the fuel tank sags, and can be fitted in a simple manner if the end of the venting line is prestressed elastically against the upper wall of the fuel tank.

Sloshing of fuel into the venting device according to the invention can be avoided in a simple manner if the venting line has a valve at its free end.

According to another advantageous development of the invention, the venting line is reliably held in its designated position if the free end of the venting line is arranged on a supporting part.

The venting device according to the invention turns out to be structurally particularly simple if the movable section has telescopic pipes which can be displaced one inside the other.

According to another advantageous development of the invention, manufacturing costs of the venting line are reduced if the movable section is designed to be flexible and tapers obliquely to the upper wall of the fuel tank. In this case, the movable section may be designed, for example, as a corrugated pipe.

According to another advantageous development of the invention, the movable section can be reliably sealed with a particularly low constructional outlay if it has an expansion bellows or a corrugated hose.

The elastic prestressing of the free end of the venting line against the upper wall of the fuel tank requires a particularly low outlay if the venting line has a spring element.

In particular with the section tapering obliquely toward the upper wall of the fuel tank, the free end of the venting line can be prestressed against the upper wall in a particularly simple manner if the spring element is designed as a leg spring or leaf spring.

A vertical support of the free end of the venting line on the upper wall of the fuel tank requires a particularly low structural outlay if the spring element is designed as a spiral coil spring which prestresses the telescopic pipes or the expansion bellows.

According to another advantageous development of the invention, the installation of the movable section of the venting line turns out to be particularly simple if one of the telescopic pipes has an elongated recess and the other of the telescopic pipes has a latching hook which penetrates the recess and is short in relation thereto.

According to another advantageous development of the invention, the control of the valve requires a particularly low outlay if the valve has a float.

BRIEF DESCRIPTION OF THE DRAWINGS

The invention permits numerous embodiments. To further clarify its basic principle two of these are illustrated in the drawing and are described below. In the drawing FIG. 2 shows an enlarged sectional illustration of a venting line from FIG. 1, FIG. 3 shows a further embodiment of the venting line from FIG. 1 in an enlarged sectional illustration.

DETAILED DESCRIPTION OF THE INVENTION

Figure 1:
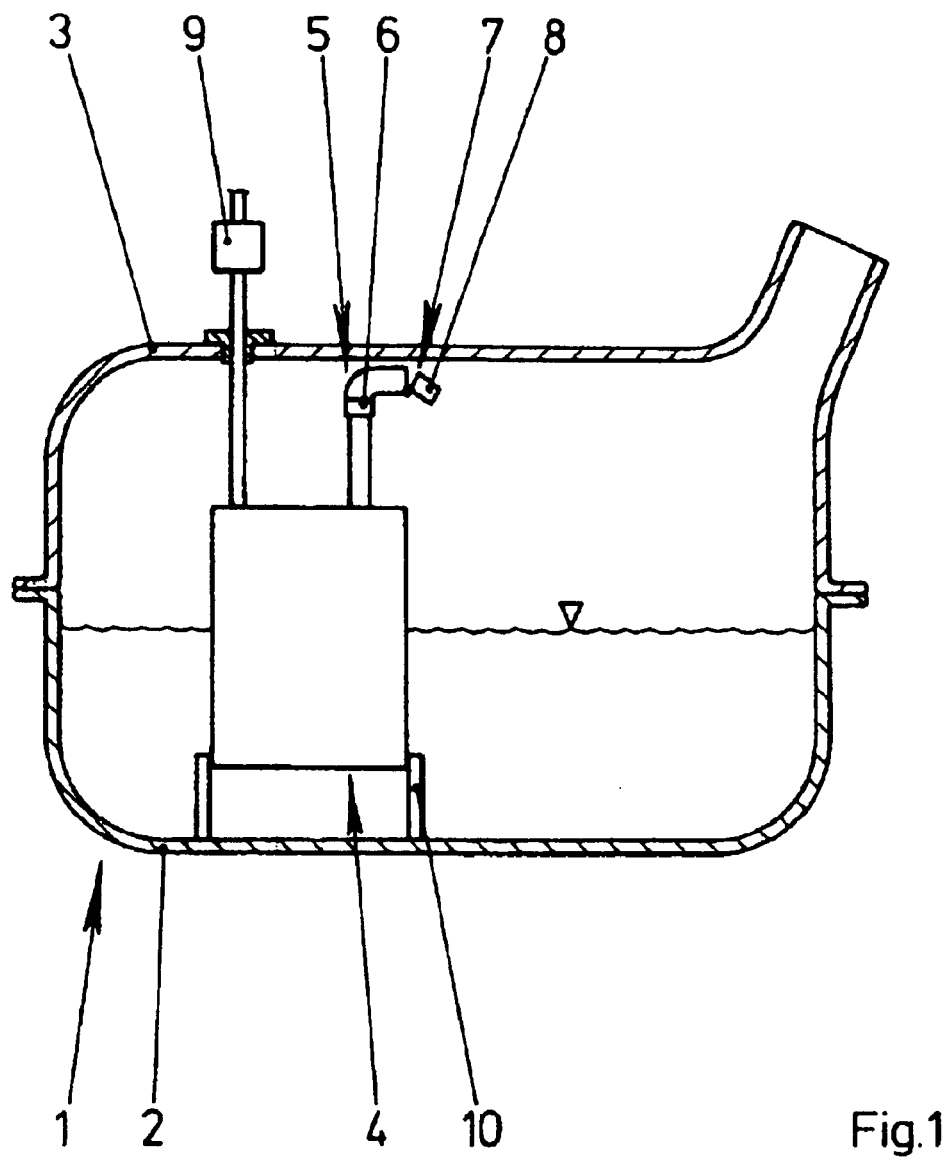
FIG. 1 shows a schematic sectional illustration of a fuel tank with a venting device according to the invention.

FIG. 1 shows a fuel tank 1 having two shell parts 2, 3. FIG. 1 furthermore shows a venting device 4 having a venting line 5 guided in the upper region of the fuel tank 1. The free end of the venting line 5 has a movable section 6 and is supported on the upper wall of the fuel tank 1. In addition, the free end of the venting line 5 holds a valve 7 with a pivotably mounted float 8. This prevents fuel from being able to slosh into the venting device 4. A further line is connected to an activated carbon filter 9 arranged outside the fuel tank 1. The lower of the shell parts 2 holds a mount 10 for the venting device 4. For installation purposes, the venting device 4 is fitted in the mount 10 and then the upper of the shell parts 3 is placed onto the lower shell part 2 and sealingly connected to the latter at the edges.

A condenser, for example, can be arranged within the venting device 4 and gases flowing in via the venting line 5 are cooled in it, so that the hydrocarbons contained in the gases condense out. The hydrocarbons which are condensed out are fed to the fuel tank 1. The remaining part of the gases passes into the environment via the activated carbon filter 9. The venting device 4 furthermore serves to allow air to flow into the fuel tank 1 from the surroundings when fuel is consumed. Of course, the venting device 4 may have more than the one venting line 5 which is illustrated leading to the activated carbon filter 9 for refueling the fuel tank 1 and for operation thereof.

FIG. 2 shows the free end of the venting line 5 from FIG. 1 in a greatly enlarged sectional illustration. The movable section of the venting line 5 has two telescopic pipes 11, 12. The telescopic pipes 11, 12 are sealed off from each other via a laminated seal 13 and are prestressed by means of a spring element 14. The inner of the telescopic pipes 11 is connected fixedly to the venting device 4 illustrated in FIG. 1 while the outer of the telescopic pipes 12 is connected to the valve 7. The valve 7 has a housing part 15 with a supporting part 16 which rests on the upper wall of the fuel tank 1. The mobility of the valve 7 in relation to the inner telescopic pipe 11 is indicated by an arrow in the drawing for clarification purposes. If the lower shell part 2 of the fuel tank 1 that is illustrated in FIG. 1 sags, the spring element 14, in the direction of the arrow which is shown, evens out the movement, so that the supporting part 16 always rests on the upper wall of the fuel tank 1. The connection of the telescopic pipes 11, 12 to each other has a latching hook 17 which is arranged on the inner telescopic pipe 11. The latching hook 17 penetrates an elongated recess 18 in the outer telescopic pipe 12.

In an alternative embodiment, instead of being sealed by the laminated seal 13, the telescopic pipe 11, 12 are sealed by means of an expansion bellows 19 (illustrated by chain-dotted lines in the drawing).

FIG. 3 shows a further embodiment of the free end of the venting line 5 from FIG. 1. It can be seen here that the movable section 6 has a flexible corrugated hose 20. A spring element 21 designed as a leg spring is supported on a pipe section 22 connected fixedly to the venting device 4 (which is illustrated in FIG. 1) and prestresses a housing 23 of the valve 7 against the upper wall of the fuel tank 1. The valve 7 is therefore held pivotably in the arrow direction illustrated about a retaining pin 24 of the spring element 21.

What is claimed is:

1. A venting device for a fuel tank having a venting line which is arranged in the fuel tank and is guided as far as the upper wall, characterized in that the venting line (5) has a movable section (6) and the free end of the venting line (5) is held in its position by the upper wall of the fuel tank (1).

2. The venting device as claimed in claim 1, characterized in that the end of the venting line (5) is prestressed elastically against the upper wall of the fuel tank (1).

3. The venting device as claimed in claim 1 or 2, characterized in that the venting line (5) has a valve (7) at its free end.

4. The venting device as defined in claim 1, characterized in that the free end of the venting line (5) is arranged on a supporting part (16).

5. The venting device as defined in claim 1, characterized in that the movable section (6) has telescopic pipes (11, 12) which can be displaced one inside the other.

6. The venting device as defined in claim 1, characterized in that the movable section (6) is designed to be flexible and tapers obliquely to the upper wall of the fuel tank (1).

7. The venting device as defined in claim 1, characterized in that the movable section (6) has an expansion bellows (19) or a corrugated hose (20).

8. The venting device as defined in claim 1, characterized in that the venting line (5) has a spring element (14, 21).

9. The venting device as defined in claim 8, characterized in that the spring element (21) is designed as a leg spring or leaf spring.

10. The venting device as defined in claim 8, characterized in that the spring element (14) is designed as a spiral coiled spring which prestresses the telescopic pipes (11, 12) or the expansion bellows (19).

11. The venting device as defined in claim 5, characterized in that one of the telescopic pipes (12) has an elongated recess (18) and the other of the telescopic pipes (11) has a latching hook (17) which penetrates the recess (18) and is short in relation thereto.

12. The venting device as defined in claim 3, characterized in that the valve (7) has a float (8).

* * * * *